Figure 1:
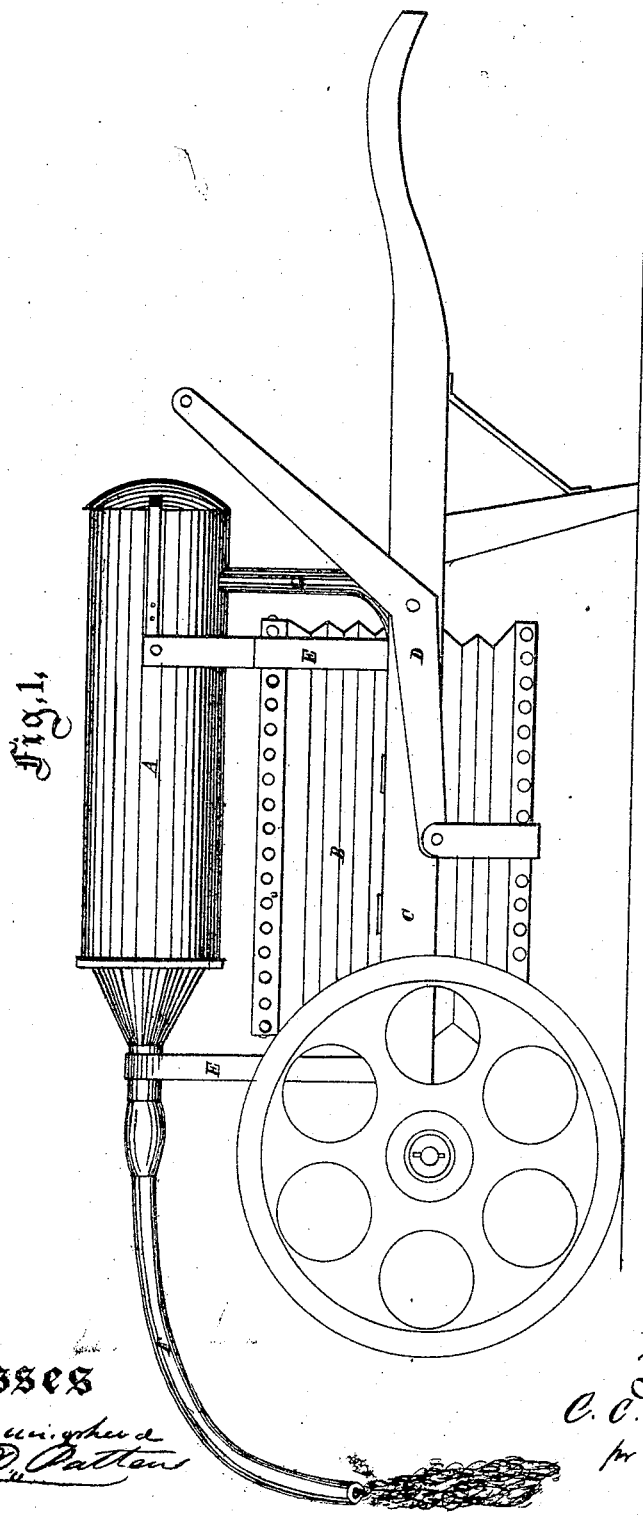

C. C. Preston.
Fumigating Plants.
Nº 72,419. Patented Dec. 17, 1867.

Witnesses

Inventor
C. C. Preston

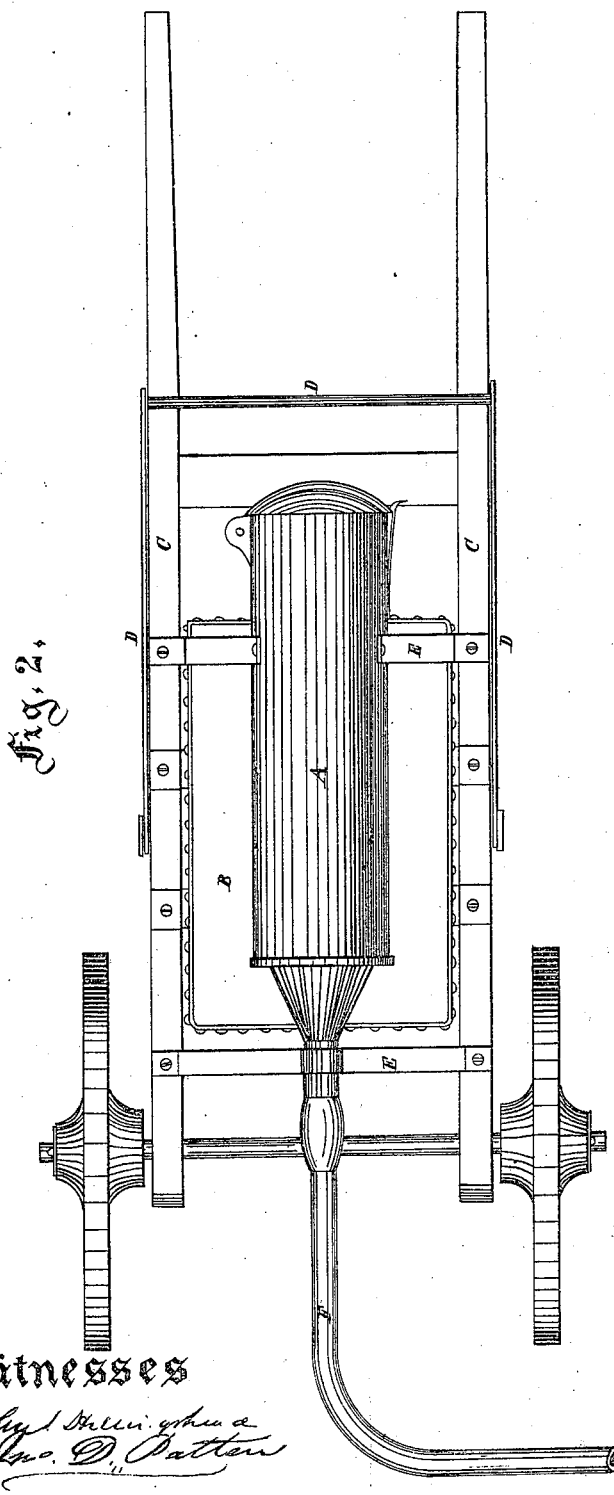

United States Patent Office.

C. C. PRESTON, OF BAYLAND, TEXAS.

Letters Patent No. 72,419, dated December 17, 1867.

---

IMPROVED APPARATUS FOR FUMIGATING PLANTS.

---

The Schedule referred to in these Letters Patent and making part of the same.

---

TO ALL WHOM IT MAY CONCERN:

Be it known that I, C. C. PRESTON, of Bayland, State of Texas, have invented certain new and useful Improvements in Fumigating-Implements; and I do hereby declare that the following is a full, clear, and exact description of the same, reference being had to the annexed drawings, and to the letters of reference marked thereon, making part of this specification, in which—

Figure 1 is a plan view, and
Figure 2 is a side elevation.

My invention consists in applying to a cylinder made of metal, and formed conical at one end, having a flexible, suitable tube of any desired length, with a door or valve at the other, to be fastened by a spring-catch or any other suitable device, having in its bottom, near the door, a small pipe connected with a double bellow placed immediately below the cylinder and fastened to a frame, which frame also supports, by proper brace the cylinder itself.

This frame may be supported like a wheel-barrow, upon one or more wheels, or it may have hand-beare and legs to hold it up.

To operate this fumigator, it is only necessary to place inside of it, beyond, but near the induction-pi the substance for fumigation, and after closing the door, by operating the handle of the bellows, the air fa the fire, and at the same time forces the smoke through the tube to any given point where the end of it may directed.

In the drawings, A is the cylinder or retort; B, the bellows; C, carriage for transportation; D, lever operating bellows; E, supports for retort; F, flexible tube; G, blast-pipe from bellows.

Other implements for fumigating have been used; and I do not claim the cylinder, or the forcing o into it for the purpose proposed, because others have used this before; but in my invention, having conn a flexible smoke-proof pipe, which may be of any length, with the cylinder, to conduct the fumes of the no compounds or other substances to every part of a plant or trees, or other place infested by insects, and h also connected therewith a powerful bellows, not only to fan the fire, but to force the fumes through the l of pipe,

What I claim as new, and desire to secure by Letters Patent of the United States, is—

1. A combination of the retort A with the flexible tube F, substantially as described.
2. The combination of the retort A, tube F, and bellows C, substantially and for the purpose descr
3. The combination of the retort A, tube F, bellows C, and carriage, substantially as described.

In testimony whereof, I have signed my name to this specification in the presence of two subscribing wi

C. C. PREST(

Witnesses:
JOHN D. BLOOR,
JOHN S. HOLLINGSHEAD.